Nov. 25, 1941.  L. K. DAVIS  2,264,070
VEHICLE SPRING CONTROL
Filed Aug. 30, 1938  2 Sheets-Sheet 1

INVENTOR
Lincoln K. Davis
BY Albert M. Austin
ATTORNEY

Nov. 25, 1941.  L. K. DAVIS  2,264,070
VEHICLE SPRING CONTROL
Filed Aug. 30, 1938  2 Sheets-Sheet 2
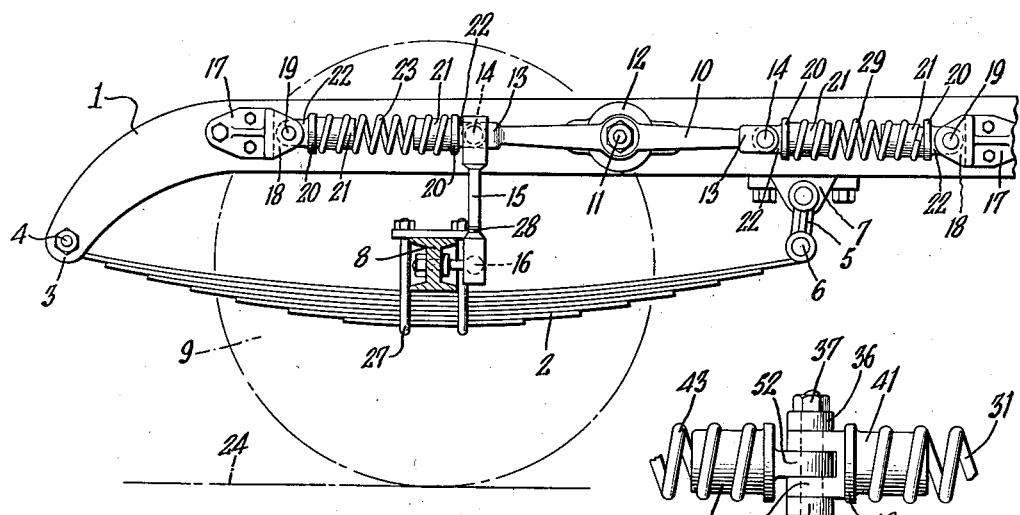
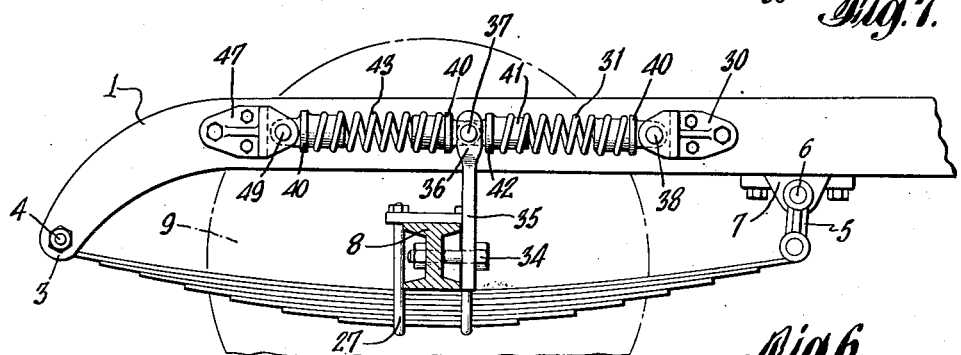
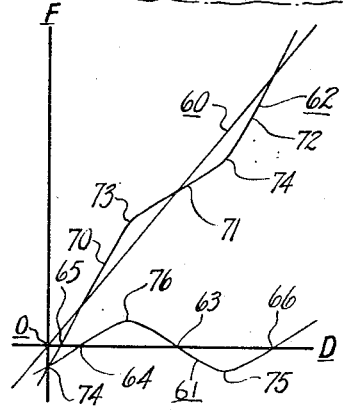
INVENTOR
Lincoln K. Davis
BY Albert M. Austin
ATTORNEY Patented Nov. 25, 1941

2,264,070

UNITED STATES PATENT OFFICE 2,264,070

VEHICLE SPRING CONTROL

Lincoln K. Davis, Brockton, Mass.

Application August 30, 1938, Serial No. 227,485

9 Claims. (Cl. 267—16)

My invention relates to resilient suspension systems, and in particular concerns spring means commonly employed to suspend a vehicle on its wheels, to minimize the transmission of shocks from the wheels to the body of the vehicle.

One of the objects of the invention is to provide a greater degree of comfort for passengers in the vehicle by increasing the effective resiliency of the usual springs.

Another object is to increase the distance through which the springs are effective in carrying the load imposed upon them.

Still another object is to protect the springs or other parts of the vehicle from damage due to excessive amplitude of motion of the wheels when traveling over very rough surfaces.

A fourth object is to provide a simple and rugged device which may be adapted to the usual type of spring suspension with a minimum of change, by making use of parts already existing as parts of the device. It is intended that the device shall be applicable to any existing type of suspension, whether employing leaf or coil springs, torsion rods, fluid cylinders, rubber cords, etc.

To accomplish the objects I have set forth, I make use of toggle or overcentering action to change the resultant characteristics of a spring suspension in a predetermined manner. It is well known that a spring of any type has a neutral or rest position, in which it is in stable equilibrium, and to which it always tends to return, if moved away from it by an outside force. On the other hand, a toggle mechanism has a dead center position, in which it is in unstable equilibrium, and from which it always tends to depart, if moved away from it by an outside force.

If a spring of given characteristics, having a certain relation between a displacement from its rest position and the force required to cause this displacement, is connected, by means of a suitable linkage, to a toggle mechanism of given characteristics, having a certain relation between a displacement from its dead center position and the force exerted by it at this displacement, it is apparent that the resultant characteristics of the two mechanisms combined will represent neither pure spring action nor pure toggle action, but a mixture of the two. Each mechanism will have its strength reduced by the other, since spring action and toggle action fundamentally are opposed to one another, as pointed out above. If the spring is of greater strength than the toggle, the resultant will be of the nature of spring action, though modified. If the toggle is of greater strength than the spring, the resultant will be of the nature of toggle action, though modified.

It is my intention to employ a toggle having less strength than the spring, and also having a range of motion, through which it acts as a toggle, less than the working range of the spring, and it is preferred that the linkage connecting the toggle and the spring be adjusted so that the toggle is in its dead center position when the spring is in its normal loaded rest position, such as when it is carrying its share of the load imposed by the weight of the vehicle at rest.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a left side elevation of a common type of front end suspension of an automobile, showing the application of a toggle mechanism to a leaf spring;

Figs. 5 and 6 are similar to Fig. 1, but show slightly different toggle mechanisms;

Fig. 7 is a fragmentary top plan view of the toggle mechanism of Fig. 6; and

Fig. 8 is a diagram of curves to assist in explaining the spring action.

Figure 1:
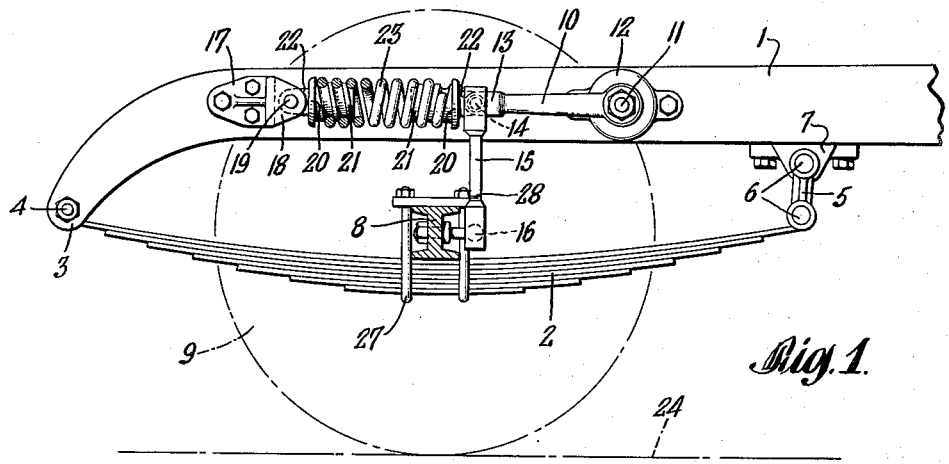

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring to Fig. 1, the frame 1 may be the frame of an automobile or of any other wheeled vehicle. An ordinary multileaved main spring 2 is attached at its forward end by a spring bolt 4 passing through an eye in the end of the spring and into a fork 3 at the end of the frame 1. At its rear end the spring is attached by an ordinary spring shackle 5, spring bolts 6 and bracket 7. The front axle 8, shown in section, is fixed to the spring 2 near its center, and carries the front wheel 9 which travels on the road surface 24, both being shown in dot-and-dash lines. The conventional device used to attach the axle 8 to the spring is denoted by 27. The usual front wheel bearings, steering mechanism, brakes and other parts are omitted to avoid confusion as they are not necessary to an understanding of the invention.

Figure 2:
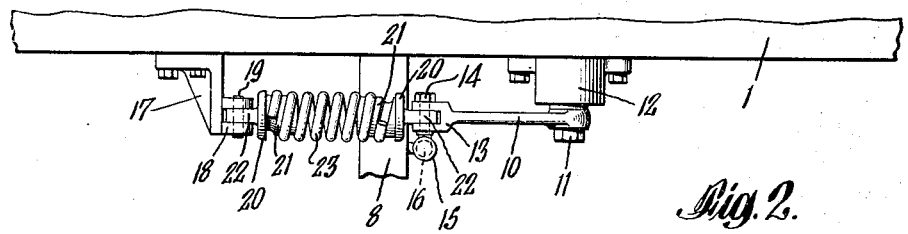
Fig. 2 is a plan view of the toggle mechanism as seen from above.

Referring to both Fig. 1 and Fig. 2, an arm 10 is pivoted at its rear end on or about a shaft 11, which is supported in a bearing 12 fixed to the frame 1. As will be seen later, bearing 12 may be furnished by a common hydraulic shock absorber, the arm 10 being similar to the usual arm of the latter, the difference being that its forward or outer end is formed in the shape of a fork 13, through which passes a substantial clevis pin 14. One end of the pin 14 is formed into a ball, engaging the upper end of a drag link 15, which is of the type commonly used with shock absorbers, and preferably is adjustable as to length in the usual manner as by screw thread adjustment 28. The lower end of the drag link 15 engages another ball 16, which is fixed to the axle 8. Thus any force which may be exerted at the end of arm 10 is communicated to the axle 8, and to the spring 2, through the medium of the drag link 15.

Further forward on the frame 1 is located a bracket 17 having a fork 18. Between bracket 17 and fork 13 on the end of arm 10 is a stout coil spring 23, which is fitted with end pieces 20, the latter having projections 21 which extend a short distance into the ends of spring 23. These projections are threaded coarsely to engage the turns of the spring 23 without lost motion. Each of the two end pieces 20 has a portion 22, one of which fits the fork 13 of the arm 10, and the other into the fork 18 of the bracket 17. Pins 14 and 19 permit the end pieces 20 to swivel in their respective forks 13 and 18.

When the parts are in the positions shown in Fig. 1, spring 23 is under compression, the degree of which is adjustable by turning either end piece 20 one or more half-turns, causing threaded projections 21 to travel either in or out of the spring 23, so changing the effective length of the latter. The spring 23 and the arm 10 comprise the principal parts of the mechanism hereinafter referred to as the toggle, toggle assembly, etc.

Figure 3:
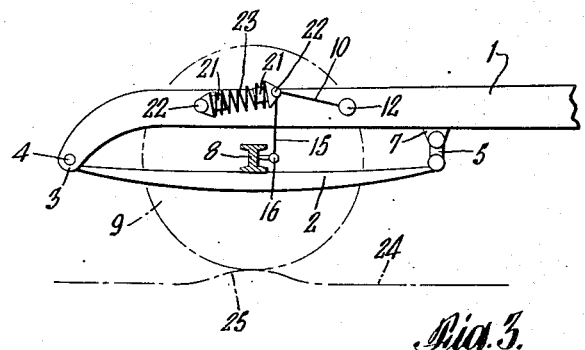
Fig. 3 shows, diagrammatically, the relation of the parts when the leaf spring is deflected upward.

The action of the complete mechanism is as follows:

Fig. 1 may represent the normal loaded rest position of the spring 2, the toggle being, in the present example, in its dead center position of unstable equilibrium. Referring to Fig. 3, the axle 8 is here shown raised from its position of Fig. 1, as by a small elevation 25 in the road 24 traveled by the automobile, this raising being resisted by the main spring 2 to which it is attached, which exerts a force downward. The toggle is now above dead center, and the compressive force of toggle spring 23 seeks an escape in an upward direction, which produces an upward pull on axle 8 through the drag link 15. This pull is opposed to the force exerted by the main spring 2, so that the latter is partially neutralized, which allows axle 8 to rise with less resistance than if the toggle force were not present.

It is evident that, as axle 8 rises further, toggle spring 23 is extended further, until a point is reached at which its compressive force is spent, when main spring 2 is allowed to exert its full downward force without diminution. If axle 8 rises still more, toggle spring 23 likewise is extended more, and now may begin to exert a tension exerting a resultant force on axle 8 in a downward direction. As this direction is the same as that in which the spring 2 acts, the toggle is no longer working as such, but exhibits spring action which supplements that of the spring 2, and so aids the latter in resisting a further rise of axle 8.

Figure 4:
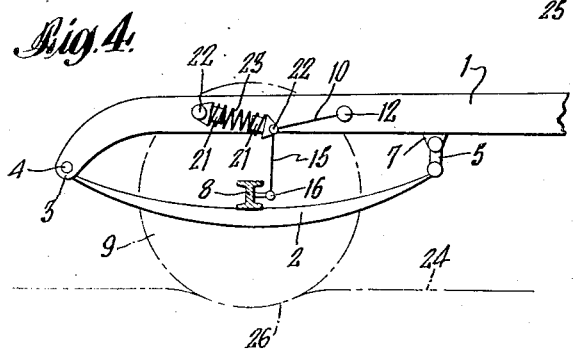
Fig. 4 shows, diagrammatically, the relation of the parts when the left spring is deflected downward.

Referring to Fig. 4, the axle 8 is shown lowered from its position in Fig. 1 as by a small depression 26 in the road traveled, this lowering being aided by the downward push of main spring 2. The toggle here is below dead center, and the compressive force of toggle spring 23 now seeks an escape downward, producing a downward thrust on the axle 8. This thrust is in the same direction as that of the spring 2, so that the toggle aids the main spring 2 in carrying the load through a range of downward motion in which the force exerted by spring 2 diminishes rapidly.

As axle 8 moves further away from the frame 1, toggle spring 23 is extended more and more, until a point is reached at which its compressive force is spent, when it no longer aids main spring 2 in carrying the load. A still further movement of axle 8 may cause a reversal of stresses on toggle spring 23, which begins to exert a tension, producing a resultant in an upward direction. As this direction is opposite to that in which the main spring 2 exerts its force, the toggle now exhibits spring action in opposition to that of spring 2, this spring action finally becoming of sufficient magnitude to overbalance spring 2, and thus check the downward motion of axle 8.

Reviewing the action of the complete spring assembly from normal loaded position on a perfectly smooth road to the limit of the upward motion of the axle, the effect of the leaf spring 2 is at first weakened by the toggle, resulting in a great sensitivity of action through a certain range. The toggle tends, in effect, to lift the wheel over any small elevation in the road surface. As the motion progresses, the toggle action lessens, disappears and finally develops into spring action, so that the leaf spring is allowed gradually to exert more force, and in the end is reinforced by the reversed or spring action of the toggle mechanism, so that excessive amplitude of motion of the axle and wheel, as under extremely rough road conditions, is increasingly resisted with more force than the leaf spring alone can develop.

Similarly, reviewing the action of the complete spring assembly from the start to the limit of the downward motion, the effect of the leaf spring is at first reinforced by the toggle, this occurring in a range in which the force exerted by the leaf spring alone is diminishing rapidly, so the result is a greater range of effective and sensitive spring action. The toggle here tends to push the wheel down into any small depression in the road, and so to prevent the vehicle body from falling. As the motion is carried further, the toggle action diminishes, disappears and turns into spring action, as before, so that extreme amplitude of motion of the axle and wheel is inhibited.

Referring once more to Fig. 1, as spring 23 exerts a relatively large force on bearing 12, the latter should be of ample size and strong construction. Therefore, in some cases, it may prove desirable to offset this force by extending arm 10 backward, and providing a second spring identical with spring 23, a bracket the same as bracket 17, etc., as indicated in Fig. 5. Here the force exerted by spring 23 on bearing 12 is neutralized by the opposing force of a second spring 29, and bearing 12 may be of more ordinary construction. It is evident that the toggle effects of the two springs will be additive as arm 10 rotates, and also that each toggle spring need be of but half the strength required if but one spring is used, as in the case described in detail above.

As pointed out previously, arm 10 and bearing 12 may be parts of a common type of hydraulic shock absorber or damping device. The design and capacity of bearing 12 obviously will depend on the loading, i. e. whether one or two toggle springs are used, as seen above. It is also possible to avoid the use of any arm, by substituting a second toggle spring in the manner to be described.

Referring now to Figs. 6 and 7, brackets 47 and 30 have disposed between them identical coil springs 43 and 31, both under compression. Spring 43 is fitted with two end pieces 40, while spring 31 has one end piece 40, these being identical with end pieces 20 shown in Fig. 1. Spring 31 is fitted at its forward end with an end piece 42 having a threaded projection 41 like that of end pieces 20, but end piece 42 has a fork 53, like fork 13 on the end of arm 10 in Fig. 1, this fork 53 being made to receive the portion 52 of the rear end piece 40 fitted to spring 43. The end pieces 40 at the outer ends of springs 43 and 31 are swivelled in brackets 47 and 30 by pins 49 and 38, respectively. Attached to axle 8 by bolts 34 is an upstanding member 35, slightly flexible from front to rear, but rigid laterally, this member having a fork 36 at its upper end, wide enough to embrace the smaller fork 53 and portion 52 therebetween. A pin 37 swivels these last three parts together, so that motion of the axle 8 is imparted to the junction of the springs 43 and 31.

It is seen that the springs 43 and 31, being under compression, comprise a toggle mechanism, which is on dead center when the springs are aligned axially. Furthermore, it is apparent that their action is similar to that of the spring and arm toggle described in the first case considered, for during the early stages of any motion away from dead center, they exert a force also away from this position. Then, as the motion progresses, this force falls to zero, and beyond this point reverses in direction as the springs begin to act in tension.

Referring now more particularly to Fig. 8, the above analysis of the combined spring action will be better understood from the curves. These curves are plotted showing the forces exerted by the several springs as a function of displacement. The force axis is denoted by F, the displacement axis by D and the origin by O. The curve indicating the individual action of the leaf spring 2 is denoted by 60. The curve denoting the individual action of the overcentering assembly or toggle 23, 10 is denoted by 61. The resultant of curves 60 and 61 is denoted by 62 and represents the characteristic of the entire spring assembly.

The main spring 2 is represented as following Hooke's law, in which the force exerted by it is proportional to the displacement from zero position, so curve 60 is a straight line passing through the origin O, the latter representing the point at which the main spring is unloaded, or carrying no weight. The characteristic of the overcentering assembly is of the nature of a cubic curve, which may be intersected at three points by a straight line, as for example the displacement axis. Upward displacements of the center of the main spring and reciprocable portions of the overcentering or toggle mechanism are represented at the right of the force axis. Downward forces exerted by the center of the main spring and overcentering assembly on the axle are indicated above the displacement axis.

When the toggle is at dead center position, it exerts force neither upward or downward. This condition is indicated at point 63 on the D-axis. As the center of the main spring moves upward (Fig. 3), the toggle exerts an upward force reaching a peak at point 75. Beyond this the upward force lessens, and at point 66 disappears, the compressive force of the toggle spring here being exhausted, while still further along this curve the force reverses in direction as the toggle spring begins to act in tension.

As the center of the main spring moves downward from the dead center of the toggle (Fig. 4), the latter exerts a downward force which reaches a maximum at point 76, thereafter diminishing to zero at point 64, and beyond this reversing in direction as the toggle spring reverses its direction of action from compression to tension.

Adding curves 60 and 61 graphically, the resultant curve 62 is obtained. This curve gives the combined spring action of the leaf spring 2 and of the overcentering assembly. The steep part of the curve, indicated by 70, represents a spring stiffer than the leaf spring alone. The flat part 71 of the curve indicates a spring considerably softer than the leaf spring and the steep part of the curve 72 indicates a spring action stiffer than the leaf spring alone.

It will be noted that the resultant curve 62 crosses the D-axis at 65, and the F-axis at 74. This part of curve 62 represents the forces and displacements when a deep depression is encountered in the pavement when the weight of the wheels and axles may be sufficient to change the resultant force exerted by the complete spring assembly to a downward direction. The reversing point is indicated by 65. The point where displacement of the main spring becomes zero is 74.

The spring tensions and the relation between the main spring and the overcentering assembly may be adjusted so that with average load, the vehicle will operate along the flat part 71 of the curve 62, giving soft spring action. If desired, the vehicle, when empty, may operate around the knee 73 of the composite curve. When completely loaded, it may operate around the knee 74 of the composite curve. If overloaded, the vehicle may operate about the steep part of the curve

72 which is of advantage in reducing further displacement to a minimum to prevent the chassis from hitting the axle.

It is not intended that the toggle mechanism used be limited to the compression spring types here taken as examples, for it is readily conceivable that any other form of toggle, employing either compression or tension forces, or any mechanism exhibiting toggle or overcentering action, may be used to accomplish the purposes explained herein.

It is obvious that a toggle mechanism or its equivalent, of any type, may be applied at every or any wheel or axle of a vehicle, regardless of the number of such wheels or axles, and also regardless of the type of spring or other resilient suspension to be modified according to the principles herein laid down. A common form of leaf spring suspension has been chosen for simplicity in the drawings and explanation, but it is contemplated that a coil spring suspension lends itself equally well to the application of toggle forces, likewise a torsion rod or other type of resilient support.

The intention, with any form of springing, is to provide a predetermined range of extremely resilient and sensitive action, such as is obtained with a very long or soft spring, but with an abrupt stiffening of the action at extreme amplitudes of wheel or axle motion, this stiffening being of the type obtained with a short and hard spring. Thus the advantages of both soft and hard springs are obtained in one mechanism, but without their disadvantages.

It is not necessary, nor may it prove desirable in some cases, to have the toggle mechanism on dead center when the suspension spring is at its rest position with average load. The linkage, for example, drag link 15 of Fig. 1, may be made adjustable as to length, so that a given setting of the toggle may be effected at any desired point in the travel of the suspension spring, such as leaf spring 2, thus allowing a large degree of control over the resultant characteristic of the toggle and spring combination. Nor is it required that the toggle spring, such as spring 23, exert both compression and tension, for in certain cases either one or the other, and not both, may be advantageous. For example, it may be desirable to weaken the effect of a suspension or other spring through a predetermined range, but not to reinforce it beyond this range. In this case the toggle spring would be arranged to be under compression through the intended range, but inert beyond it.

While certain novel features of the invention have been disclosed and are pointed out in the annexed claims, it will be understood that various omissions, substitutions and changes may be made by those skilled in the art without departing from the spirit of the invention.

What is claimed is:

1. In a vehicle suspension, a vehicle having a sprung part and an unsprung part, a main supporting spring between said parts, a toggle device acting between said parts for modifying the action of said main spring, said toggle device comprising at least one compression spring, said compression spring having positive interlocking connection with the parts of said toggle device, whereby said spring is under compression when the toggle is in dead center position and in tension when said toggle is beyond a predetermined distance from dead center position in either direction.

2. In a vehicle suspension, a vehicle having first and second parts, one of which is sprung and the other unsprung, a main supporting spring between said parts, a damping device comprising a casing mounted on said first part, damping mechanism in said casing, an arm journalled in said casing and connected to said damping mechanism, a compression spring connected to said first part and to the end of said arm substantially in line therewith to form a toggle device, and a drag link connecting said second part and said toggle device.

3. In a vehicle suspension, a vehicle having a sprung part and an unsprung part, a main supporting spring between said parts, a toggle device for modifying the action of said main spring, said toggle device comprising normally aligned arms, a joint flexibly connecting said arms to each other at one end, supports fixed to one of said parts by which said arms are engaged by their other ends, a drag link connected to said other part, at least one of said arms constituting a compression spring comprising a helical spring member having a fitting at each end thereof, said fittings having helical grooves in which the convolutions of said spring member have screw thread engagement, said drag link being also connected to one of said arms, adjustable means for adjusting the effective length of said link, said spring being under compression when the toggle is in dead center position and in tension when said toggle is beyond a predetermined movement from dead center position in either direction.

4. In a vehicle suspension, a vehicle having first and second parts, one of which is sprung and the other unsprung, a main supporting spring between said parts, a toggle for modifying the action of said main spring comprising a rigid arm, a flexible connection between said arm and said first part, a toggle spring opposed to said arm, a second flexible connection between said toggle spring and said first part, a third flexible connection between said toggle spring and said arm and located between said first and second flexible connections so as to produce a dead center position of said toggle spring and arm with the toggle spring in compression, displacement from dead center position releasing a force tending to increase said displacement, and a longitudinally rigid link between said arm and said second part, said flexible connections positively tying said toggle spring and rigid arm together and to said first part so that said toggle spring may be in tension when said toggle is beyond said dead center position.

5. In a vehicle suspension, a vehicle having first and second parts, one of which is sprung and the other unsprung, a main supporting spring between said parts, a toggle for modifying the action of said main spring comprising opposed toggle members, at least one of which is a toggle spring, flexible connections between the remote ends of said toggle members and said first part, a third flexible connection between said toggle members located so as to produce a dead center position of said toggle with the toggle spring in compression, displacement from dead center position releasing a force tending to increase said displacement, and a link between said toggle and said second part, said flexible connections positively tying said toggle members together and to said first part so that said toggle spring may be in tension when said toggle is beyond said dead center position.

6. In a vehicle suspension, a vehicle having first and second parts, one of which is sprung and the other unsprung, a main spring between said parts, a damping device comprising a casing mounted on said first part, damping mechanism in said casing, a rotary support journalled in said casing and connected to said damping mechanism, said support having oppositely extending rigid arms, toggle springs acting between the ends of said arms and said first part, said arms and toggle springs forming, in effect, opposed toggle assemblies to reduce the pressure of said toggle springs on said damping device, means connecting said second part and said support, whereby the overcentering action of said toggle assemblies modifies the action of said main spring.

7. In a vehicle suspension, a vehicle having first and second parts, one of which is sprung and the other unsprung, a main supporting spring between said parts, a spring toggle device for modifying the action of said main spring mounted on one of said parts and connected to the other part, said toggle device being so constructed and arranged that, when displaced from dead center through a limited range, it exerts force tending to increase said displacement from dead center and, when displaced beyond said limited range, it exerts force resisting further displacement from dead center.

8. In a vehicle suspension, a vehicle having first and second parts, one of which is sprung and the other unsprung, a main supporting spring between said parts, a spring toggle device for modifying the action of said main spring mounted on one of said parts and connected to the other part, said toggle device being so constructed and arranged that it exerts force away from dead center for limited displacements in either direction and force toward dead center for additional displacements.

9. In a vehicle suspension, a vehicle having first and second parts, one of which is sprung and the other unsprung, a main supporting spring between said parts, a spring toggle device for modifying the action of said main spring mounted on one of said parts and connected to the other part, said toggle device being so constructed and arranged that the spring suspension exhibits, through its intermediate range of movement, characteristics softer than said main spring and, at the ends of its movement, characteristics harder than said main spring.

LINCOLN K. DAVIS.